United States Patent [19]

Ueno et al.

[11] Patent Number: 5,703,426
[45] Date of Patent: Dec. 30, 1997

[54] FIELD SYSTEM ASSEMBLY OF COMMUTATOR MOTOR, COMMUTATOR MOTOR HAVING FIELD SYSTEM ASSEMBLY, AND METHOD FOR MANUFACTURING FIELD SYSTEM ASSEMBLY

[75] Inventors: Makoto Ueno, Takefu; Katsutoshi Fujita, Fukui; Tetsuo Shimasaki, Fukui-ken, all of Japan

[73] Assignee: Matsushita Electric Industrial Co., Ltd., Kadoma, Japan

[21] Appl. No.: 466,978

[22] Filed: Jun. 6, 1995

[30] Foreign Application Priority Data

Jun. 6, 1994 [JP] Japan .................................. 6-123660

[51] Int. Cl.⁶ .................................................. H02K 1/12
[52] U.S. Cl. ........................... 310/258; 310/259; 310/178; 310/180; 29/596
[58] Field of Search ................................ 310/258, 259; 29/596, 598

[56] References Cited

U.S. PATENT DOCUMENTS

| | | | |
|---|---|---|---|
| 3,643,118 | 2/1972 | Ichiki et al. | 310/40 |
| 3,644,767 | 2/1972 | Kasargod et al. | 310/254 |
| 3,802,066 | 4/1974 | Barrett | 29/296 |
| 3,809,938 | 5/1974 | Sjoberg et al. | 310/254 |
| 4,263,524 | 4/1981 | Diederichs | 310/112 |
| 4,612,702 | 9/1986 | Wheeler | 29/596 |
| 4,698,539 | 10/1987 | Workman | 310/216 |
| 5,045,742 | 9/1991 | Armstrong et al. | 310/254 |
| 5,182,848 | 2/1993 | Wheeler | 29/596 |
| 5,239,743 | 8/1993 | Santandrea | 29/596 |
| 5,402,028 | 3/1995 | Koeber et al. | 310/259 |

FOREIGN PATENT DOCUMENTS

| | | |
|---|---|---|
| 2033060 | 1/1972 | Germany . |
| 59-151859 | 9/1983 | Japan .................... 310/179 |

OTHER PUBLICATIONS

Jp 58-151859 Japanese Abstract 58-159859, "Field Core For Motor w/Computator" Feb. 3, 1982.

*Primary Examiner*—Clayton E. LaBalle
*Assistant Examiner*—Elvin G. Enad
*Attorney, Agent, or Firm*—Wenderoth, Lind & Ponack

[57] ABSTRACT

A field system assembly of a double pole commutator motor includes a pair of yokes each having a connecting portion at both ends thereof, and a pair of poles each having a connecting portion which is capable of being connected with one of the connecting portions of the yoke. A slot at each pole for introducing a winding thereinto. The field system assembly includes four split parts. A winding is wound around the pole from the outside of the core by using a flyer and then, one of the connecting portions of each pole and the corresponding connecting portion of one of the yokes is pressed into the other.

11 Claims, 7 Drawing Sheets

FIELD SYSTEM ASSEMBLY OF COMMUTATOR MOTOR, COMMUTATOR MOTOR HAVING FIELD SYSTEM ASSEMBLY, AND METHOD FOR MANUFACTURING FIELD SYSTEM ASSEMBLY

BACKGROUND OF THE INVENTION

The present invention relates to a field system assembly of a commutator motor for use in vacuum cleaners, power tools, and the like; the commutator motor having the field system assembly; and a method for manufacturing the field system assembly.

Figure 7:
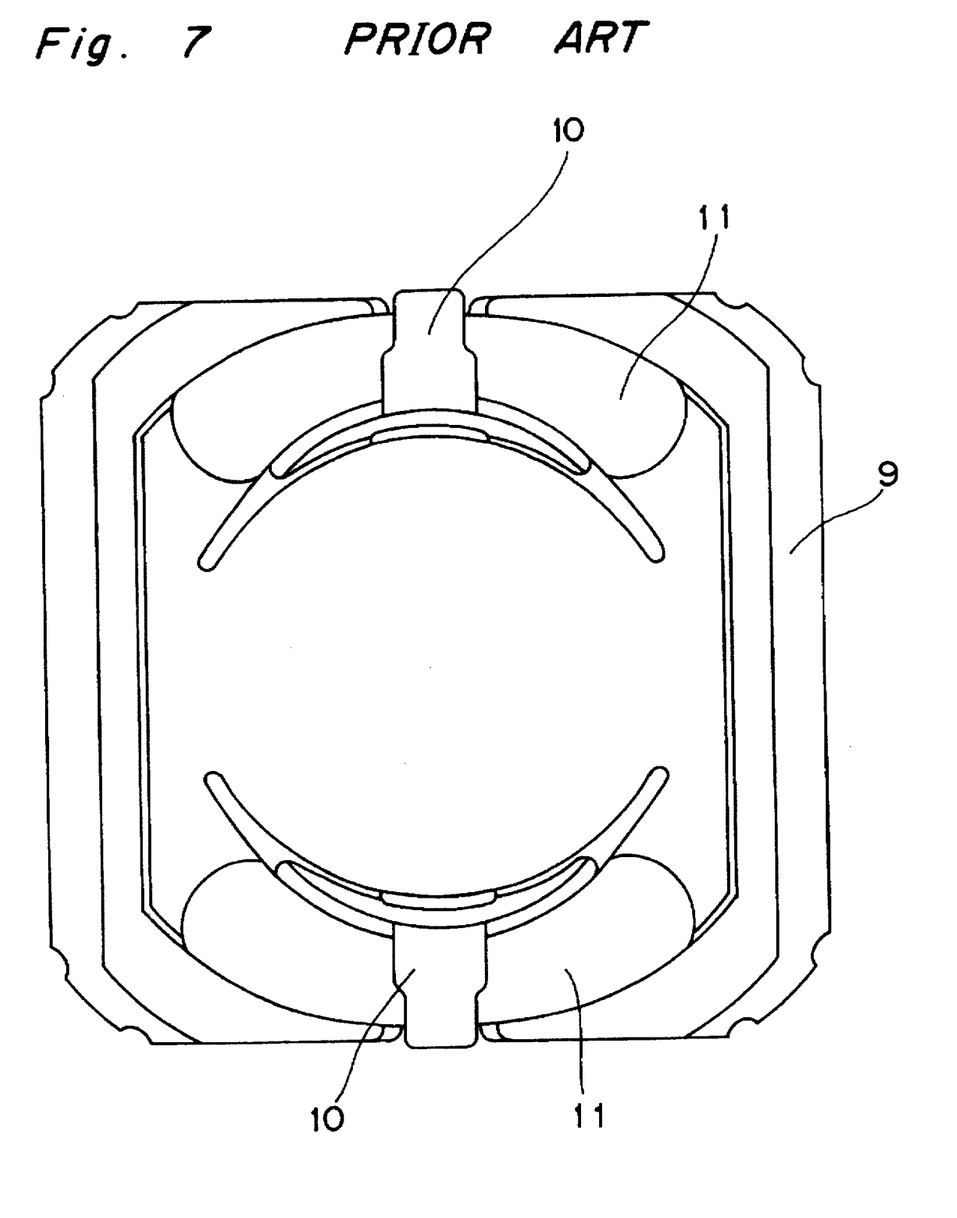
FIG. 7 is a front view showing a conventional field system assembly.

FIG. 7 is a front view showing a conventional field system assembly. Referring to FIG. 7, the field system assembly includes a field core 9 having a plurality of electric iron plates laminated one on the other. A field winding 11 is wound on the field core 9 around a winding frame 10 serving as an insulator.

Figure 8:
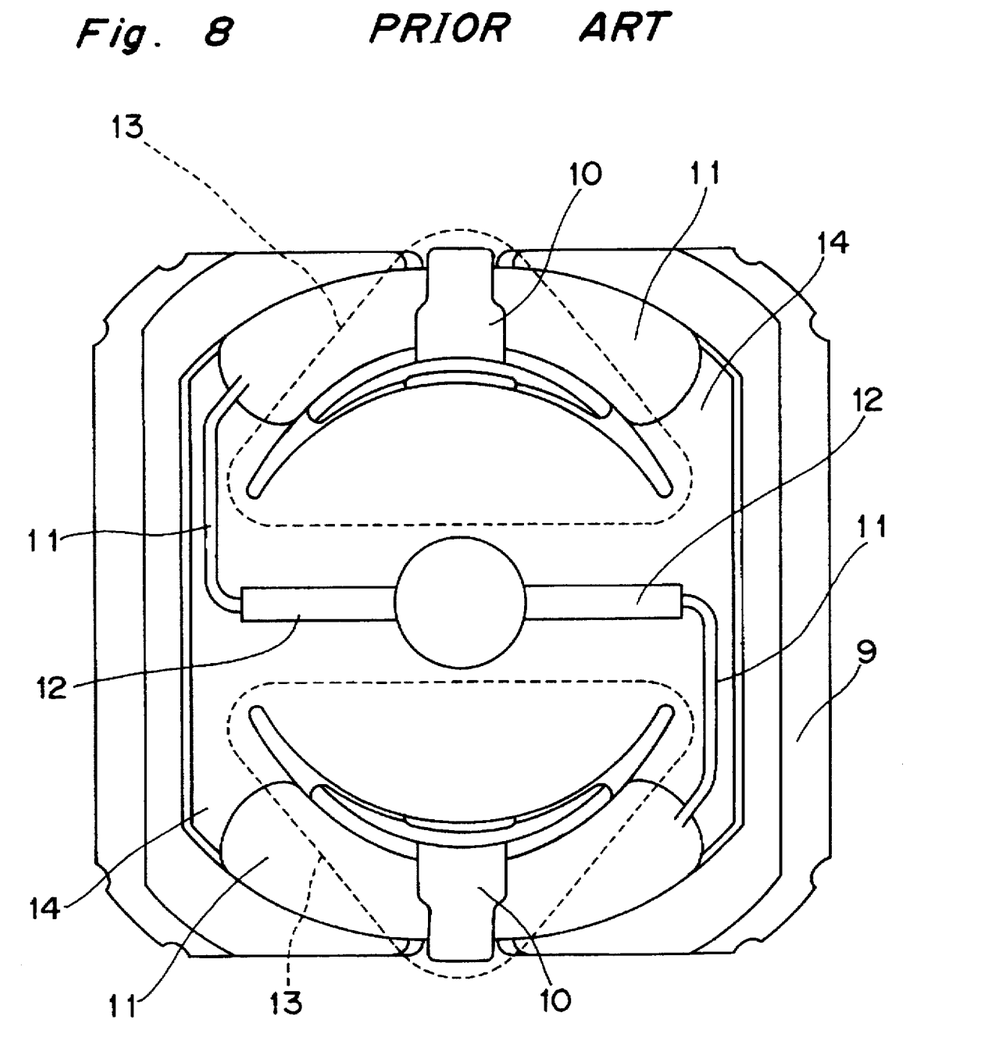
FIG. 8 is a front view, showing the field system assembly, for explaining a method for manufacturing the conventional field system assembly shown in FIG. 7.

FIG. 8 is a front view showing a conventional winding method. Two field windings 11 are supplied from two nozzles 12 on winding the field windings 11 in the field core 9. The two nozzles 12 move upwardly in a direction penetrating through the sheet of FIG. 8 and rotate by 180° in a rotary direction, and move downwardly in the direction penetrating through the sheet of FIG. 8 and the nozzles 12 rotate by 180° in an opposite rotary direction to the rotary direction to perform one turn of the winding. Such a turn is repeated and each guide 13 guides each field winding 11 supplied from each nozzle 12 to each slot 14 so as to wind the field windings 11 on double poles simultaneously. It is to be noted that like parts are designated by like reference numerals in FIGS. 7 and 8.

As described above, the two nozzles 12 for supplying the field windings 11 to the field core 9 rotate by 180° in the both rotary directions repeatedly while the nozzles 12 are repeatedly going into the field core 9 and going out therefrom so as to perform the winding operation. Therefore, the winding method is complicated, thus preventing the field winding 11 from being wound at a speed higher than only about 400 rpm. Further, equipment for winding the field winding is expensive. In recent years, there are growing demands for the development of commutator motors having high efficiency. In order to comply with the demands, it is necessary to reduce copper loss in producing a thick field winding. But it is difficult to do so with for the conventional winding method. For example, if the bobbin winding method is the conventional high speed winding method, the maximum diameter of the winding is 0.65 mm.

Figure 5:
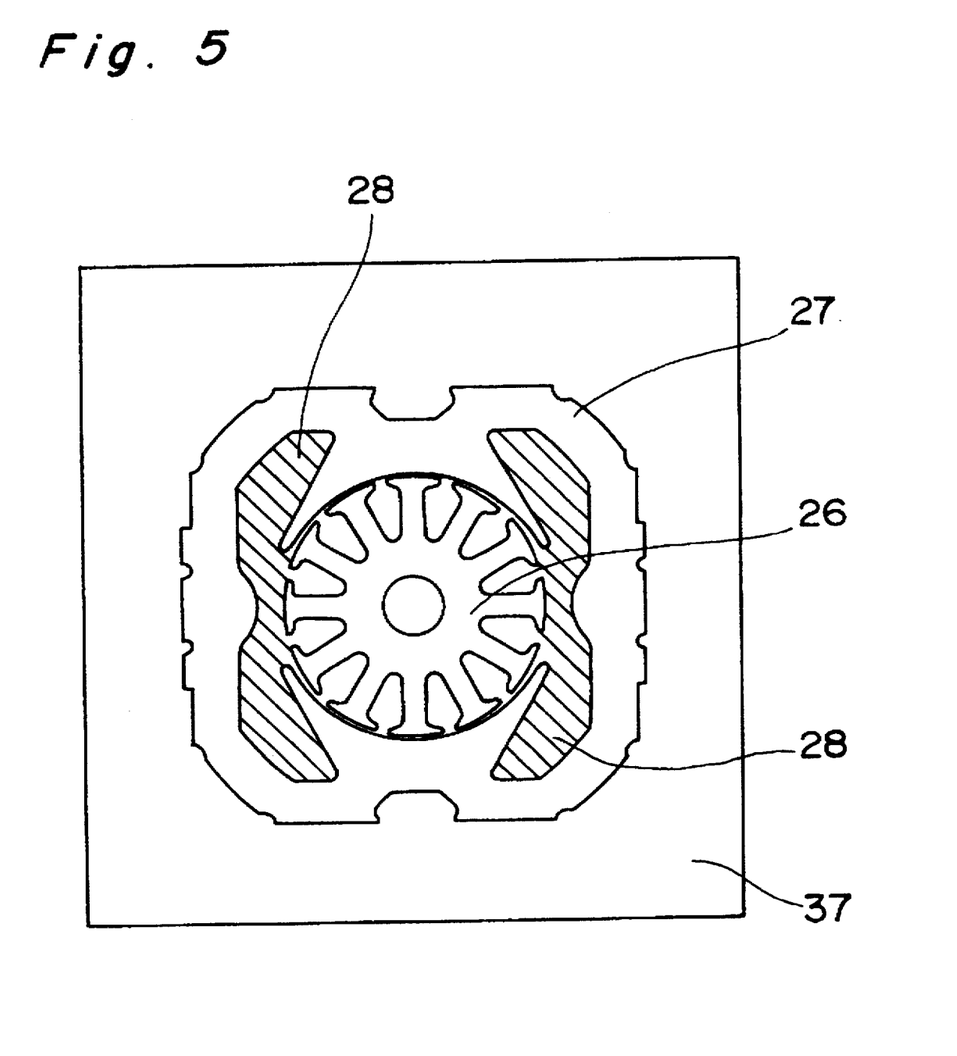
FIG. 5 is an example of an arrangement of the field core and the armature core when the field core and the armature cores of the field system assembly are punched out from an electric iron plate.
Figure 6A:
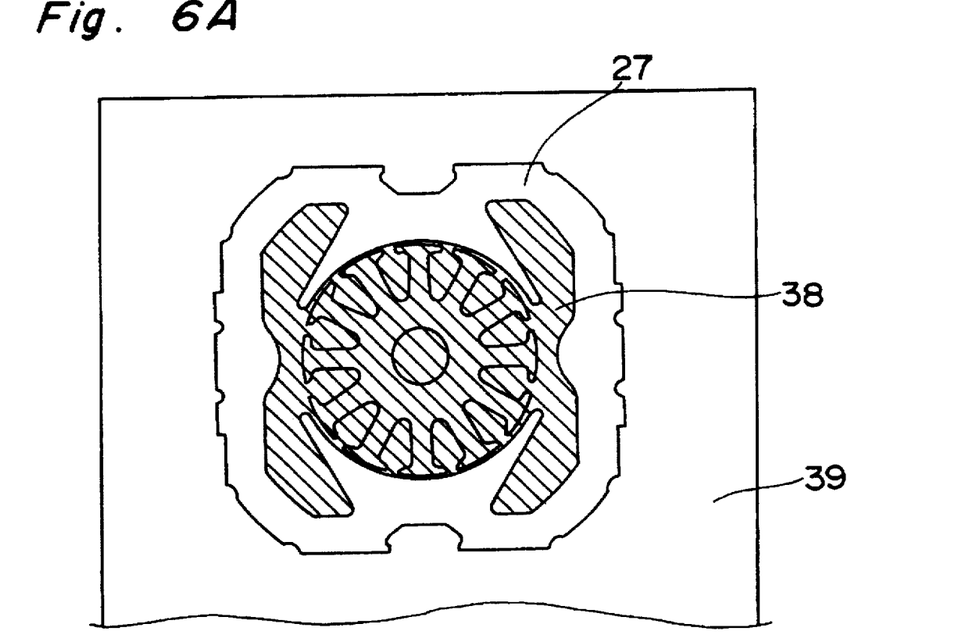
FIG. 6A is an example of arrangement of an the field core when the field core of the field system assembly is punched out from an electric iron plate.
Figure 6B:
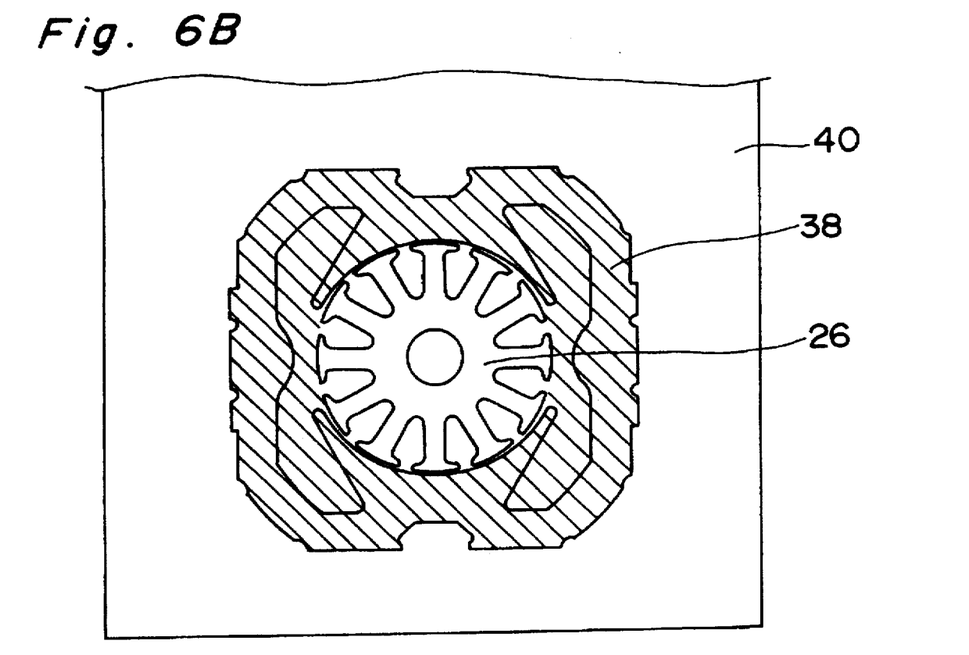
FIG. 6B is an example of arrangement of the armature core when the armature core of the field system assembly is punched out from an electric iron plate.

Moreover, in the case of a commutator motor, for use in vacuum cleaners, having a large number of rotations as high as about 30,000 to 40,000 rpm., armature iron loss is greater than field iron loss. In order to reduce the armature iron loss, a high quality electric iron plate is used such as iron plate having a large amount of silicon. Normally, as shown in FIG. 5, an armature core 26 and a field core 27 are obtained by simultaneously punching the same electric iron plate 37 to reduce the amount of waste 28. That is, although the field core loss is small, an expensive material is used to compose the field core 27 which has excessively high grade for the field core 27 and is, for example, an iron plate having a large amount of silicon. In order to reduce the cost of the material, the grade of the material 39 for the field core 27 is decreased. In this case, as shown in FIG. 6A, when the field core 27, is punched out from the electric plate 39, is different from that for the armature core, the amount of waste 38 increases, while as shown in FIG. 6B, the armature core 26 is punched out from the electric plate 40, thus increasing the amount of waste 38.

SUMMARY OF THE INVENTION

An object of the present invention is to provide a field system assembly of a commutator motor; the commutator motor having the field system assembly; and a method for manufacturing the field system assembly which allow a field winding to be wound at a high speed and to be wound automatically by means of inexpensive winding equipment.

In accomplishing these and other objects, according to a first aspect of the present invention, there is provided a field system assembly of a double pole commutator motor having a field core comprising:

a pair of yokes each having a connecting portion at each of both ends thereof; and a pair of poles each having a connecting portion which is capable of being connected with one of the connecting portions of the yoke and having a slot, for introducing a winding thereinto, formed thereon.

According to a second aspect of the present invention, there is provided a double pole commutator motor having a field core comprising:

a pair of yokes each having a connecting portion at each of both ends thereof; and a pair of poles each having a connecting portion which is capable of being connected with one of the connecting portions of the yoke and having a slot, for introducing a winding thereinto, formed thereon.

According to a third aspect of the present invention, there is provided a method for manufacturing a field system assembly of a double pole commutator motor comprising a field core having a field core comprising:

a pair of yokes each having a connecting portion at each of both ends thereof; and a pair of poles each having a connecting portion which is capable of being connected with one of the connecting portions of the yoke and having a slot, for introducing a winding thereinto, formed thereon, the method comprising the steps of:

winding the winding around each pole; and fixedly connecting the connecting portions of the poles and the connecting portions of the yokes to each other.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

An embodiment of the present invention is described below with reference to the drawings.

Figure 1:
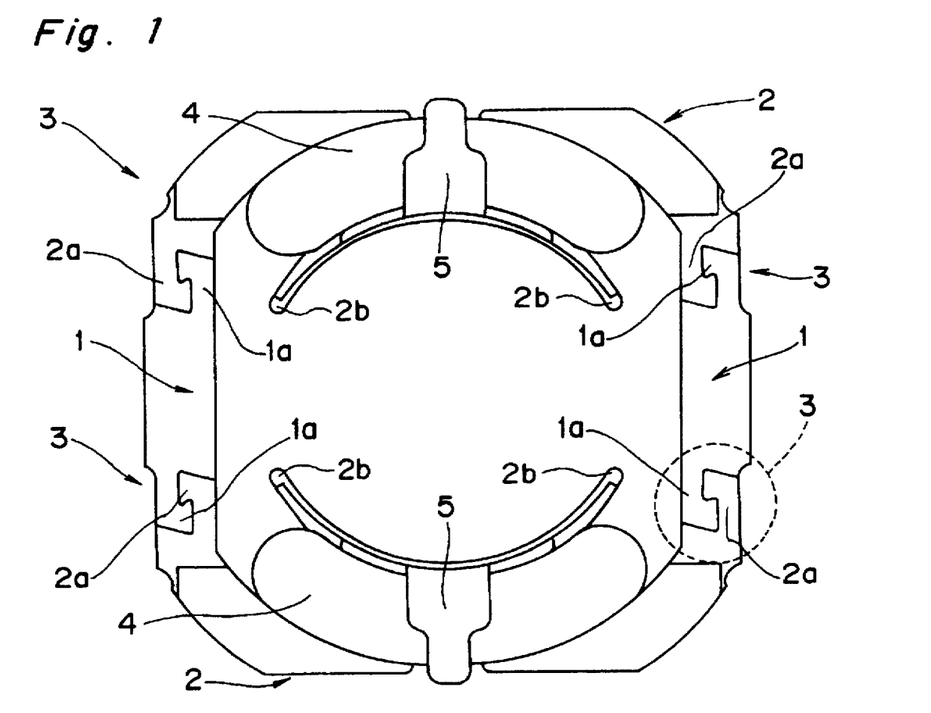
FIG. 1 is a front view showing a field system assembly according to a first embodiment of the present invention.

FIG. 1 is a front view showing a field system assembly according to an embodiment of the present invention. Referring to FIG. 1, the field system assembly includes a pair of yokes 1 of a split core formed of a plurality of split electric iron plates laminated one on the other and a pair of poles 2 of the split core formed of a plurality of electric iron plates laminated one on the other. Each yoke 1 has a key-shaped connecting portion 1a formed at each end thereof. Each pole 2 has a key-shaped connecting portion 2a, corresponding to the connecting portion 1a of each yoke 1, formed at each end thereof. The connecting portion 2a of each pole 2 is fixedly pressed into the connecting portion 1a of each yoke 1 so as to constitute a connecting portion-assembled portion 3. A field winding 4 is wound to the pole 2 around a winding frame 5 which serves as an insulator.

The field system assembly of the embodiment includes the pair of yokes 1 and the pair of poles 2. After the field winding 4 is wound around the winding frame 5 mounted on each pole 2 and before assembling, each yoke 1 and each pole 2 are connected with each other via the connecting portion-assembled portion 3 formed by fixedly pressing one of the connecting portion 2a of each pole 2 and a connecting portion 1a of each yoke 1 into each other. In this embodiment, the connecting portion-assembled portions 3 are unsymmetrical with respect to the centers of the pole 2 and the yoke 1, respectively, so as to laminate only one of the front and rear surfaces of the yokes 1 and the poles 2 on the other to reduce dimensional variation of the yokes 1 and the poles 2 in pressing.

However, in another embodiment, in punching a field core from an iron plate, the total thickness of an iron core including a plurality of split iron cores is measured and each split iron core is combined with each yoke depending on the thickness. In this case, the yokes and the iron cores are combined with each other tightly regardless of whether the upper surface of each yoke is turned upward or downward, thus reducing the dimensional variation. Therefore, in this case, the connecting portion-assembled portions 3 are allowed to have various configurations without having the unsymmetrical configuration.

Figure 2:
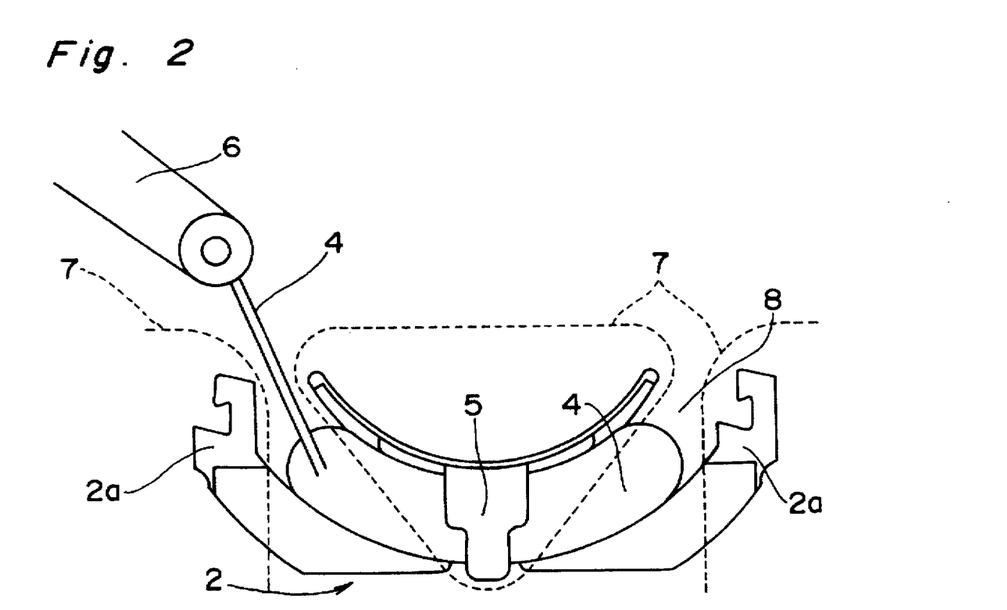
FIG. 2 is a front view, showing a pole, for explaining a field system winding method to be applied to the field system assembly shown in FIG. 1 according to the first embodiment.

FIG. 2 is an explanatory view for explaining a field system winding method according to an embodiment of the present invention. Referring to FIG. 2, a flyer 6 supplies the field system windings. When the yokes 1 are not connected to both ends of the pole 2 before assembling the field system assembly, the flyer 6 rotates around the winding frame 5 mounted on the pole 2 so as to wind the field winding 4 around the winding frame 5, while the field winding 4 is being introduced into a slot 8 formed on the pole 2 by a guide 7 for guiding the field winding 4 into the slot 8. It is to be noted that like parts are designated by like reference numerals in FIGS. 1 and 2. The guide 7 is normally made of iron and the surface of the guide 7 is polished to prevent it from damaging the winding 4.

As described above, the field core of the double pole commutator motor according to the present invention is split into four parts, including the pair of yokes 1 each having the key-shaped connecting portion 1a positioned at each end thereof; and the pair of poles 2 each having the key-shaped connecting portion 2a positioned at each end thereof and having the slot 8 formed thereon to accommodate the field winding 4, one of the key-shaped connecting portions 1a and a key-shaped connecting portion 2a being capable of being pressed into the other. According to such a construction, as described above, after the winding 4 is wound to each pole 2 by the flyer 6 from the outer peripheral side of the core, the pair of yokes 1 and the pair of poles 2 are fixedly pressed into each other via the key-shaped connecting portions 1a and the key-shaped connecting portions 2a to assemble the field system assembly.

The winding operation can be performed on the poles 2 of the four-split field system core, with the yokes 1 being not connected to the both ends of each pole 2, that is, under a condition before the field system is assembled. Thus, the winding operation is not interrupted by the yokes 1 and only the rotation of the flyer 6 allows the winding operation to be performed on the poles 2, thus increasing the winding speed, reducing the steps for the winding operation, and making it possible to automatically perform the winding operation with inexpensive winding equipment. Depending on the diameter of the winding, for example, as compared with a conventional speed of about 400 rpm., the speed can be increased to about 1,500–2,000 rpm. in the embodiment. When the tip end of the key-shaped connecting portions 2a at each end of the pole 2 is greatly projected from the tip end 2b of the pole 2, or the yoke 1 is connected to the key-shaped connecting portions 2a of the pole 2 so as to greatly project toward the tip end 2b of the pole 2, this interrupts the rotation of the flyer 6 in the winding operation, thus making it difficult to perform high speed winding operations. Therefore, it is preferable that the yoke 1 is not connected to each key-shaped connecting portion 2a of the pole 2 and the key-shaped connecting portion 2a is not greatly projected toward the tip end 2b of the pole 2. It is necessary to ensure the certain length of the key-shaped connecting portions 2a of the pole 2 in order to ensure a space of the slit 8 has a certain volume to some extent. Then, according to the embodiment, as shown in FIG. 1, the tip end of the key-shaped connecting portions 2a of the pole 2 is adapted to be elongated to a position approximately corresponding to the tip end 2b of the pole 2. Moreover, in order to increase the winding speed while the winding operation is performed with the yokes 1 being not connected to the both ends of the pole 2, it is necessary to split the core into four parts, that is, the pair of poles 2 and the pair of the yokes 1.

The diameter of the winding has some limitations because yokes 1 are present at the both ends of the pole 2 in the winding operation of the pole 2 in the conventional method. For example, the maximum limitation of the diameter of the winding is 0.65 mm in winding the winding around a bobbin. In contrast, according to the embodiment, since the yokes 1 are not connected to the both ends of the pole 2 in the winding operation of the pole 2, the diameter of the winding can be increased over that of a conventional winding. For example, the diameter of the winding can be increased to 1.2 mm.

Figure 4A:
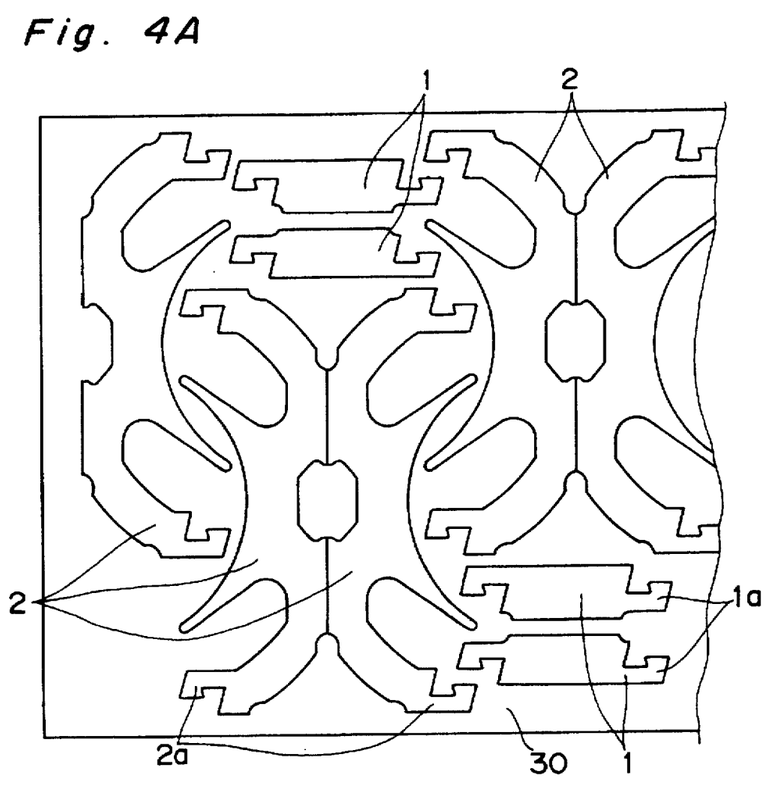
FIG. 4A is an example of arrangement of field cores, each split into four parts, when the field cores of the field system assemblies are punched out from an electric iron plate.
Figure 4B:
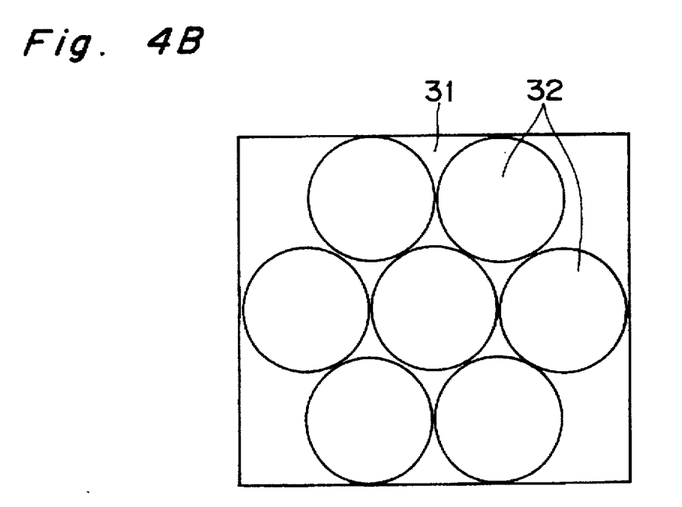
FIG. 4B is an example of an arrangement of the armature cores when the armature cores of the field system assemblies are punched out from an electric iron plate.

In the conventional method, since the field core is not split into a plurality of parts, a rectangular frame of the field core is punched out from a plate without splitting it. Therefore, a portion 38 indicated by oblique lines in FIG. 6A becomes waste and thus the large amount of waste is produced. Then, there is proposed a method for reducing the amount of waste wherein as shown in FIG. 5, the field core 27 and the armature core 26 are punched out from one electric plate 37 made of the same material and the armature core 27 is punched out from the inside of the field core 27 in order to reduce the amount of waste 28. In contrast with this, according to the embodiment, as shown in FIGS. 4A and 4B, since the field core is constituted by the four split parts, the four split parts can be arranged at desired positions and combined with each other so as to reduce the amount of waste to a minimum when the yokes 1 and the poles 2 are punched out from the electric plates to a minimum. Thus, the amount of waste 30 when the field core is punched out from the electric plate can be greatly reduced. Then, elements 32 for punching the armature cores therefrom can be arranged at desired positions on the electric plate for the armature core to reduce the amount of waste 31. Moreover, since the four split parts of the field core are arranged at desired positions to reduce the amount of waste, as shown in FIG. 4, material used for the field core can be different from the material used for armature core, so that the field cores can be effectively punched out from the former material and the armature cores can be effectively punched out from the latter material. The grade and cost of the material for the field core having a small iron loss is lower than that of the material for the armature core. Therefore, an inexpensive material can be used without lowering the efficiency of the motor.

Figure 3:
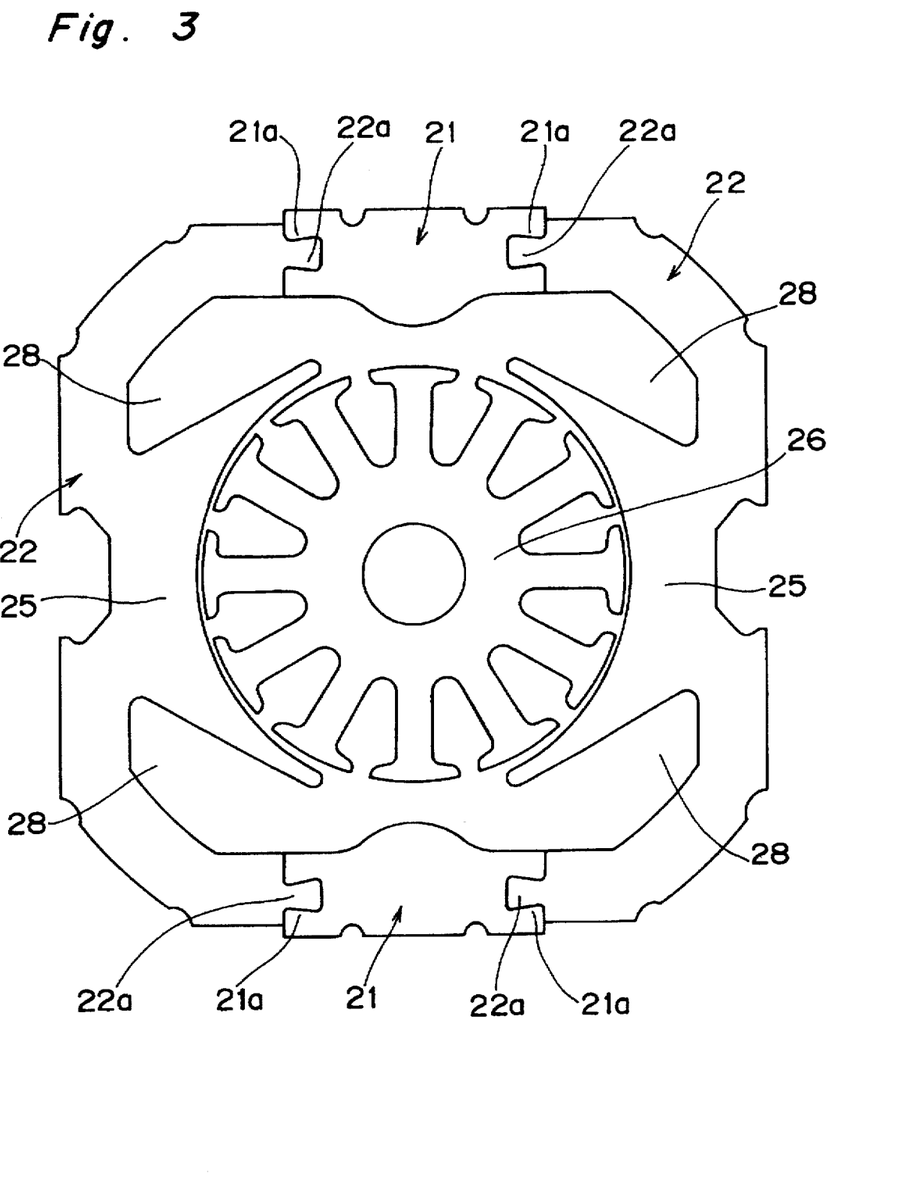
FIG. 3 is a front view of a field system assembly of second embodiment of the present invention.

The configurations of the key-shaped connecting portion 1a of the yoke 1 and the key-shaped connecting portion 2a of the pole 2 are not limited to those shown in FIG. 1. For example, the configurations of FIG. 3 can be applied to the yokes 1 and poles 2. In FIG. 3, the field core includes two poles 22, two yokes 21, and winding frames 25. A key-shaped connecting portion 22a of the pole 22 has a configuration wherein one portion is projected from the center of each end of the pole 22. A key-shaped connecting portion 21a of the yoke 21 is constructed by a dovetail groove into which the projected key-shaped connecting portion 22a is fixedly pressed. FIG. 3 shows a condition where the armature core 26 is located at the center of the field core. Reference numeral 28 denotes a slot for accommodating the winding therein. In FIG. 3, the key-shaped connecting portion 21a of the yoke 21 can have a configuration wherein one portion is projected from the center of each end of the yoke 21 and the key-shaped connecting portion 22a of the pole 22 can be constructed by a dovetail groove into which the projected key-shaped connecting portion 21a is fixedly pressed. The key-shaped connecting portions 21a and 22a can have other configurations different from the above.

As described above, according to the field system assembly of the double pole commutator motor and the commutator motor, the assembly is constructed with four split core parts: i.e. the yokes having the key-shaped connecting portions and the poles having the key-shaped connecting portions having the slot and capable of connecting to the key-shaped connecting portions of the yokes. After the winding is formed on each pole by the flyer from the outside of the core before the assembly is assembled, the key-shaped connecting portions of each yoke are fixedly pressed into the key-shaped connecting portions of each pole, or the key-shaped connecting portions of each pole are fixedly pressed into the key-shaped connecting portions of each yoke and thus the assembly is assembled. Therefore, when the winding is formed on each pole by the flyer, the winding operation is not interrupted by the yokes and thus the winding speed of the field winding can be increased, an automatic winding operation can be carried out with inexpensive equipment, and the diameter of the winding can be easily increased without any interruption.

Since the field core is split into the four core parts, the core parts can be arranged at desired positions so that the amount of waste can be reduced when the core parts are punched out from a plate. When the material from which the field core is punched is different from the material from which the armature core is punched, it can prevent the amount of waste of the field core from increasing. The grade and cost of the material for punching the field core having a small iron loss are lower than those of the material for punching the armature core. In this manner, an inexpensive material can be used without lowering the efficiency of the motor.

According to the method for manufacturing the field system assembly, as described above, since the winding operation can be performed without the yokes at connected both ends of each pole, the winding speed can be increased by the inexpensive flyer without any mechanism for moving upward and downward and the diameter of the winding can be increased as compared with the conventional method. When the four split core parts of the field core are punched from the electric plate, the core parts can be combined and arranged at any positions so as to greatly reduce the amount of waste. When a material from which the field core is punched is different from a material from which the armature core is punched, it can prevent the amount of waste of the field core from increasing, and thus different materials for the field core and the armature core can be selected.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A field core for a field system assembly of a double pole commutator motor, said field core comprising:

a first pole forming a winding slot and having a first connecting portion and a second connecting portion;

a second pole, positioned opposite said first pole, forming a winding slot and having a first connecting portion and a second connecting portion, wherein said first connecting portion of said first pole opposes said second connecting portion of said second pole, and said second connecting portion of said first pole opposes said first connecting portion of said second pole;

a first yoke having a first connecting portion and a second connecting portion, wherein said first connecting portion of said first yoke engages said first connecting portion of said first pole, and said second connecting portion of said yoke engages said second connecting portion of said second pole; and a second yoke, located opposite said first yoke, having a first connecting portion and a second connecting portion, wherein said first connecting portion of said second yoke engages said first connecting portion of said second pole, and said second connecting portion of said second yoke engages said second connecting portion of said first pole, wherein said first connecting portion of said first yoke is pressed into engagement with said first connecting portion of said first pole, said second connecting portion of said yoke is pressed into engagement with said second connecting portion of said second pole, said first connecting portion of said second yoke is pressed into engagement with said first connecting portion of said second pole, and said second connecting portion of said second yoke is pressed into engagement with said second connecting portion of said first pole.

2. The field core as claimed in claim 1, wherein:

each of said first and second connecting portions of said first and second yokes and said first and second poles has a configuration which is key-shaped;

said configuration of said first connecting portion of said first pole and said configuration of said first connecting portion of said first yoke are complimentary;

said configuration of said second connecting portion of said first pole and said configuration of said second connecting portion of said second yoke are complimentary;

said configuration of said first connecting portion of said second pole and said configuration of said first connecting portion of said second yoke are complimentary; and said configuration of said second connecting portion of said second pole and said configuration of said second connecting portion of said first yoke are complimentary.

3. The field core as claimed in claim 2, wherein:

said first and second connecting portions of said first yoke are asymmetrical with respect to each other;

said first and second connecting portions of said second yoke are asymmetrical with respect to each other;

said first and second connecting portions of said first pole are asymmetrical with respect to each other; and said first and second connecting portions of said second pole are asymmetrical with respect to each other.

4. The field core as claimed in claim 1, wherein:

said first and second connecting portions of said first yoke define a first recess and a second recess, respectively;

said first and second connecting portions of said second yoke define a first recess and a second recess, respectively;

said first and second connecting portions of said first pole define a first projection which is fixedly pressed into said first recess of said first yoke, and a second projection which is fixedly pressed into said second recess of said second yoke; and said first and second connecting portions of said second pole define a first projection which is fixedly pressed into said first recess of said second yoke, and a second projection which is fixedly pressed into said second recess of said first yoke.

5. The field core as claimed in claim 1, wherein:

said first and second connecting portions of said first yoke are asymmetrical with respect to each other;

said first and second connecting portions of said second yoke are asymmetrical with respect to each other;

said first and second connecting portions of said first pole are asymmetrical with respect to each other; and said first and second connecting portions of said second pole are asymmetrical with respect to each other.

6. The field core as claimed in claim 1, wherein:

each of said first and second connecting portions of said first and second yokes and said first and second poles has a configuration which is key-shaped;

said configuration of said first connecting portion of said first pole and said configuration of said first connecting portion of said first yoke are complimentary;

said configuration of said second connecting portion of said first pole and said configuration of said second connecting portion of said second yoke are complimentary;

said configuration of said first connecting portion of said second pole and said configuration of said first connecting portion of said second yoke are complimentary; and said configuration of said second connecting portion of said second pole and said configuration of said second connecting portion of said first yoke are complimentary.

7. The field core as claimed in claim 1, wherein:

said first and second connecting portions of said first yoke define a first recess and a second recess, respectively;

said first and second connecting portions of said second yoke define a first recess and a second recess, respectively;

said first and second connecting portions of said first pole define a first projection which is fixedly pressed into said first recess of said first yoke, and a second projection which is fixedly pressed into said second recess of said second yoke; and said first and second connecting portions of said second pole define a first projection which is fixedly pressed into said first recess of said second yoke, and a second projection which is fixedly pressed into said second recess of said first yoke.

8. The field core as claimed in claim 1, wherein:

said first and second connecting portions of said first yoke are asymmetrical with respect to each other;

said first and second connecting portions of said second yoke are asymmetrical with respect to each other;

said first and second connecting portions of said first pole are asymmetrical with respect to each other; and said first and second connecting portions of said second pole are asymmetrical with respect to each other.

9. A double pole commutator motor having a field core and a rotatable armature core located within said field core and being formed of a material which is different from a material forming said field core, said field core comprising:

a first pole forming a winding slot and having a first connecting portion and a second connecting portion;

a second pole, positioned opposite said first pole, forming a winding slot and having a first connecting portion and a second connecting portion, wherein said first connecting portion of said first pole opposes said second connecting portion of said second pole, and said second connecting portion of said first pole opposes said first connecting portion of said second pole;

a first yoke having a first connecting portion and a second connecting portion, wherein said first connecting portion of said first yoke engages said first connecting portion of said first pole, and said second connecting portion of said yoke engages said second connecting portion of said second pole; and a second yoke, located opposite said first yoke, having a first connecting portion and a second connecting portion, wherein said first connecting portion of said second yoke engages said first connecting portion of said second pole, and said second connecting portion of said second yoke engages said second connecting portion of said first pole, wherein said first connecting portion of said first yoke is pressed into engagement with said first connecting portion of said first pole, said second connecting portion of said yoke is pressed into engagement with said second connecting portion of said second pole, said first connecting portion of said second yoke is pressed into engagement with said first connecting portion of said second pole, and said second connecting portion of said second yoke is pressed into engagement with said second connecting portion of said first pole.

10. A method of manufacturing a field system assembly of a double pole commutator motor having a field core and a rotatable armature core, said method comprising:

punching plates for the rotatable armature core from a plate formed of a first material;

punching plates for the field core from a material which is different from said material used for said armature core;

forming a winding in a slot defined by a first pole having first and second connecting portions;

forming a winding in a slot defined by a second pole having first and second connecting portions;

fixedly connecting said first and second connecting portions of said first pole with a first connecting portion of a first yoke and a second connecting portion of a second yoke, respectively; and fixedly connecting said first and second connecting portions of said second pole with a first connecting portion of said second yoke and a second connecting portion of said first yoke, respectively.

11. A method of manufacturing a field system assembly of a double pole commutator motor having a field core and a rotatable armature core, said method comprising:

punching plates from a first material for the rotatable armature core;

punching plates from a second material for forming the field core, wherein said second material is different than said first material;

laminating said punched-out plates of said second material in order to form poles and yokes of said field core;

laminating said punched-out plates of said first material to form said rotatable armature core;

forming windings in slots defined by the poles; and fixedly connecting portions of said poles with portions of said yokes in the laminating direction.

* * * * *